Nov. 16, 1943. G. F. KEELERIC 2,334,494
ABRASIVE ARTICLE AND METHOD OF MAKING THE SAME
Filed Dec. 11, 1942
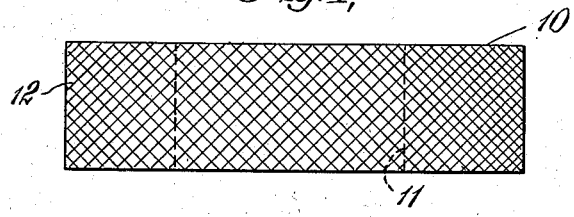
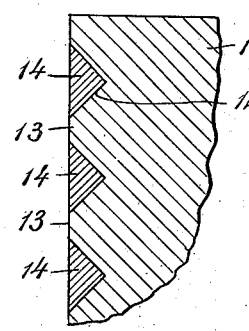
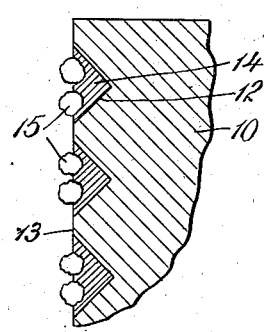
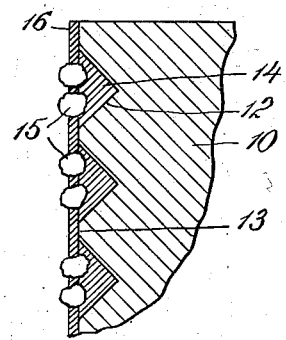
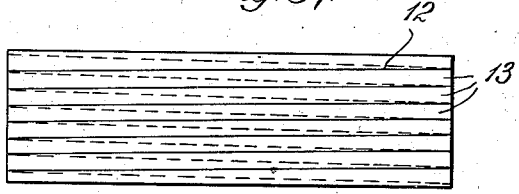
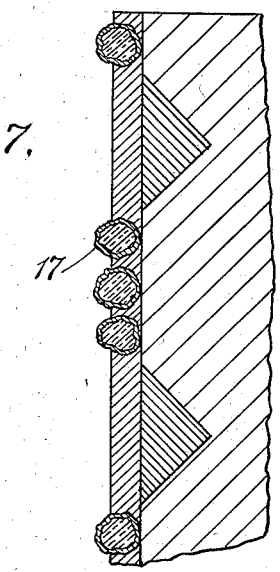
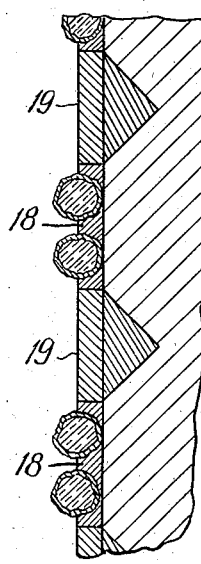
INVENTOR
George F. Keeleric
BY
ATTORNEYS Patented Nov. 16, 1943

2,334,494

UNITED STATES PATENT OFFICE 2,334,494

ABRASIVE ARTICLE AND METHOD OF MAKING THE SAME

George F. Keeleric, Westboro, Mass.

Application December 11, 1942, Serial No. 468,641

5 Claims. (Cl. 51—309)

This invention relates to abrasive articles or tools used for cutting and grinding purposes and including a working surface in which abrasive particles are anchored by a layer of a bonding material. More particularly, the invention is concerned with a novel abrasive article or tool, which is superior to similar tools as heretofore manufactured in that the abrasive particles are more firmly bonded in place and better distributed. The invention further comprehends a new method by which the tool of the invention may be conveinently and inexpensively produced.

In the manufacture of abrasive tools of the type which includes a blank or body, on the working surface of which abrasive particles, such as diamond dust, are anchored by a layer of a hard bonding metal, difficulties have been encountered in distributing the particles and holding them in place on the working surface until the bonding metal can be applied, and various expedients have been proposed as a solution of the problems encountered. If the surface is coated with an adhesive prior to the application of the particles thereto, it is difficult to obtain uniform distribution of the particles and the presence of the adhesive interferes with subsequent operations, as, for example, when the bonding metal is applied by electrodeposition. It has, accordingly, been proposed to render the particles magnetic by coating them appropriately and employing a magnetic field to hold the particles in place on the working surface of the tool until the bonding metal can be applied. This procedure, however, is not satisfactory because the concentration of the magnetic flux through the working surface of the tool is not likely to be uniform and the layer of particles, therefore, usually has a greater density near the edges of the working surface than in the central area thereof.

Another method that has been proposed for holding the particles in place on the working surface of the tool blank until the bonding metal can be applied involves applying a layer of a soft metal, such as copper, to the surface of the tool and then embedding the particles in the copper, after which a layer of bonding metal is applied over the copper to anchor the particles. This procedure does not produce satisfactory results because the bonding metal, which is usually nickel, will not adhere properly to the soft metal or the soft metal may flow under the temperature conditions of use. The separation of the bonding metal is likely to be accelerated when large particles are used, since when these are embedded in the soft metal, the latter may be distorted to form ridges around the particles with corresponding weak spots in the layer of bonding metal. To overcome the latter difficulty, it has been proposed to form grooves in the surface of the soft metal layer and to hold the particles in the grooves by a magnetic field until the bonding metal can be applied. This procedure, however, is unsatisfactory in practice, particularly when the particles are of fine size, because the grooves must be shallower than the particles in order that the particles may project therefrom and it is difficult to cut such fine grooves in the soft metal surface.

The present invention is, accordingly, directed to the provision of an abrasive article or tool in which the particles are anchored in the working surface more firmly than has been possible in the production of prior similar tools. Also, the new tool is of such construction that proper distribution and holding of the particles in place prior to and during the application of the bonding metal may be readily effected.

The tool of the invention includes a blank of a suitable metallic substance, such as steel, having a working surface in the face of which are cut grooves of substantial depth and in an arrangement which insures a good cutting effect. The grooves are then filled with a material which is different from that of the blank, the grooves being so filled that the working surface of the blank is formed in part of the hard metal and in part of the filler material. The particles may then be distributed over the working surface and held in place thereon while the bonding metal is applied in either of two ways. According to one procedure, the grooves are filled with a relatively soft metal and the particles are distributed over the filler metal and embedded therein to a limited degree after which, the bonding metal is applied over the entire working surface in any suitable way, as by electrodeposition, spraying, etc. The bonding metal used is one having the characteristics of adhering well to the hard metal forming the tool blank and it partially encloses the abrasive particles. With this arrangement, the particles are firmly held in place, since the bonding metal adheres firmly to the blank between the bodies of filler metal.

In an alternative method of applying and anchoring the particles, a magnetic field is used and the blank is made of magnetic material, the filler material is non-magnetic, and the particles are coated to render them magnetic. When the body is placed in the magnetic field, the flux tends to be concentrated through the portions of the working surface of the blank exposed between the bodies of filler metal and proper distribution of the particles over the areas between the faces of the filler bodies is readily obtained. The particles are held in place by the field until the application of the bonding metal which partially encloses the particles and binds them to the blank. The bonding layer may leave the filler material exposed, in which event, filler material is later applied over the material in the grooves to lie flush with the layer of bonding metal. If preferred, the bonding metal may be so applied as to cover the bodies in the grooves as well as to partially enclose the particles.

For a better understanding of the invention, reference may be had to the accompanying drawing in which Fig. 1 is a view in side elevation of one form of tool made in accordance with the invention;

Figs. 2, 3, and 4 are sectional views through a portion of the tool showing different steps in its manufacture;

Fig. 5 is a view similar to Fig. 1 of a modified form of tool;

Fig. 6 is a view similar to Fig. 4 but on an enlarged scale and showing a modified construction; and Fig. 7 is a view similar to Fig. 6, showing another modified construction.

In the drawing, the blank 10 is shown in the form of a flat disc, which has an opening 11 for a shaft. The blank is preferably formed of steel and it has a peripheral working surface in which are formed a number of grooves 12. These grooves may be in any arrangement, as, for example, they may be formed by knurling, as shown in Fig. 1, and thus intersect to form a multiplicity of flat topped points or lands 13. If preferred, the grooves 12 may have the form of a continuous spiral, as illustrated in Fig. 5, separated by lands 13. The grooves are relatively large and may be deeper than the average length of the particles. In the practice of one form of the method of the invention, the grooves are filled with a relatively softer metal 14, such as copper, in an appropriate manner, as by electrodeposition or spraying, so that the working surface of the blank is formed in part by the top faces of the bodies of filler metal 14 and in part by the lands 13.

After the grooves have been filled, the abrasive particles 15 are distributed over the working surface of the blank and held in position thereon until they can be anchored in place by the application of a layer of bonding metal. In the formation of the tool shown in Fig. 4, the abrasive particles, which may be of diamond dust of suitable size dependent upon the use of the tool, are distributed over the surfaces of the bodies of metal filling the grooves and then partially embedded therein. For this purpose, the particles may be placed in position manually and forced into the relatively soft filler metal by pressure.

A layer of bonding metal 16 is then applied to cover the entire working surface of the blank and partially enclose the particles and anchor them. The bonding metal used is one which has the characteristic of adhering well to the hard metal of which the blank is formed. Thus, when the blank is made of steel, the bonding metal may be iron or nickel or successive layers of iron and nickel or chromium. The bonding metal is applied preferably by electrodeposition, although it may also be sprayed in place or applied in any other suitable manner.

In the completed tool, the particles are held in place partly by being embedded in the soft filler metal and partly by being partially enclosed in the bonding layer. The bonding layer is held firmly in place because of its good adherence to the lands on the blank. If the entire surface of the tool blank were coated with the soft filler metal, the bonding layer would be likely to strip therefrom during the use of the tool, but in the new tool, the anchorage of the bonding layer to the main body of the tool between the grooves prevents any such stripping action.

Instead of holding the particles in place on the blank, until the bonding layer can be applied, by embedding the particles in the metal filling the grooves, the particles can be held in position by magnetism. In this method, the tool blank is made of a ferromagnetic metal, the grooves are filled with a non-magnetic material, such as a suitable plastic or non-magnetic metal, and the particles are given a preliminary coating 17 of a ferromagnetic metal. Before the particles are applied to the working surface of the blank, the latter is placed in a magnetic field, the lines of force of which extend normal to the working surface. Because of the non-magnetic material in the grooves, there is a concentration of flux through the lands of the blank. When the particles are distributed on the working surface, they are concentrated on the lands and the presence of the non-magnetic material insures that there will be concentrations of flux through the lands which will insure proper distribution of the particles on those areas. While the field is maintained, the bonding metal 18 is applied to bond the particles to the blank. When the grooves are filled with non-metallic material, the layer of bonding metal will ordinarily be confined to the lands and after application of the bonding material, the spaces above the grooves will be filled, as at 19, with quantities of the material employed to fill the grooves.

When the grooves are filled with non-magnetic metallic material, the layer of bonding material 18 will preferably continue over the tops of the bodies contained within the grooves and this same arrangement may be employed with non-metallic material in the grooves, if desired. In either case, if the layer of bonding material is applied by electrodeposition, the layer may wholly enclose the particles as it builds up on the surfaces of the bodies filling the grooves. If an excess quantity of bonding material is thus applied to the surfaces of the particles, it can be removed, as by being plated off or dissolved away, before the tool is put into use.

I claim:

1. In a method of making an abrasive tool including a body of metallic material having a working surface, the steps of forming a groove in the surface, filling the groove with a softer metallic material, the surface of which lies flush with the remainder of the working surface of the body so that the latter surface is formed in part of said first metallic material and in part of the softer metallic material, distributing abrasive particles over the part of the working surface formed of softer metallic material, partially embedding said particles in said softer metallic material, and applying a bonding metal to the working surface to cover both parts thereof and partially enclose the particles and anchor them, the bonding metal having the characteristic of adhering well to the metallic material of which the body is made.

2. In a method of making an abrasive tool including a body of steel having a working surface, the steps of forming a groove in the surface, filling the groove with copper so that the surface of the copper lies flush with the remainder of the working surface of the body and the latter surface is formed in part of steel and in part of copper, distributing abrasive particles over the part of the working surface formed of copper, partially embedding the particles in the copper, and applying a bonding metal to cover the entire working surface and partially enclose the particles and anchor them, the bonding metal having the characteristic of adhering well to steel.

3. An abrasive tool for cutting and grinding which comprises a body of metallic material having a working surface provided with an elongated groove, a metallic material different from that of which the body is made filling the groove from end to end with the top of the filling flush with the remainder of the working surface, finely divided abrasive particles distributed throughout the entire surface area of the filling material and partially embedded therein, and a layer of bonding metal partially enclosing the exposed portions of the particles and anchoring the particles in place, the layer covering the entire surface of the filling material between the particles and the remainder of the working surface of the body.

4. An abrasive tool for cutting and grinding which comprises a body of steel having a working surface provided with an elongated groove, a copper filling in the groove from end to end of the latter with the top of the filling flush with the remainder of the working surface, finely divided abrasive particles distributed throughout the entire surface area of the filling and partially embedded therein, and a layer of bonding metal partially enclosing the exposed portions of the particles and anchoring the particles in place, the layer covering the entire surface of the filling between the particles and the remainder of the working surface of the body.

5. An abrasive tool for cutting and grinding which comprises a body of metallic material having a working surface formed with grooves separated by lands, a softer metallic material filling the grooves from end to end and terminating flush with the remainder of the working surface, finely divided abrasive particles distributed over the entire surface of the filling and partially embedded therein, and a layer of bonding metal covering the lands and the portions of the surface of the filling between the exposed portions of the particles, the bonding metal partially enclosing said portions of the particles and anchoring them in place.

GEORGE F. KEELERIC.